Aug. 11, 1942.  C. A. FELLERS  2,292,625
AUTO REPAIR TOOL
Filed Dec. 13, 1940  2 Sheets-Sheet 2
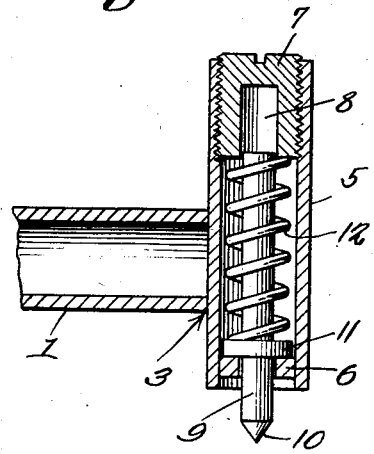
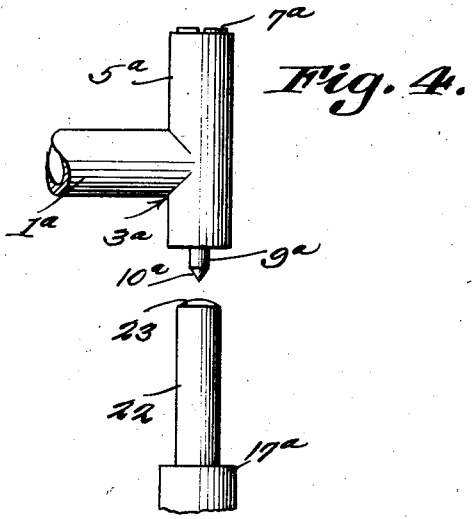
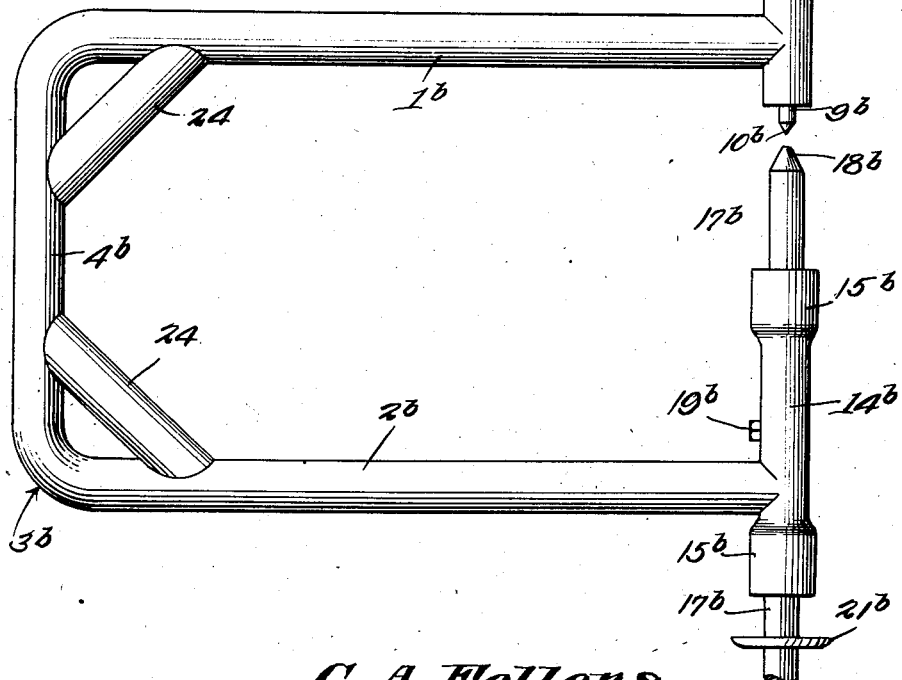
C. A. Fellers
INVENTOR.
BY
ATTORNEYS.

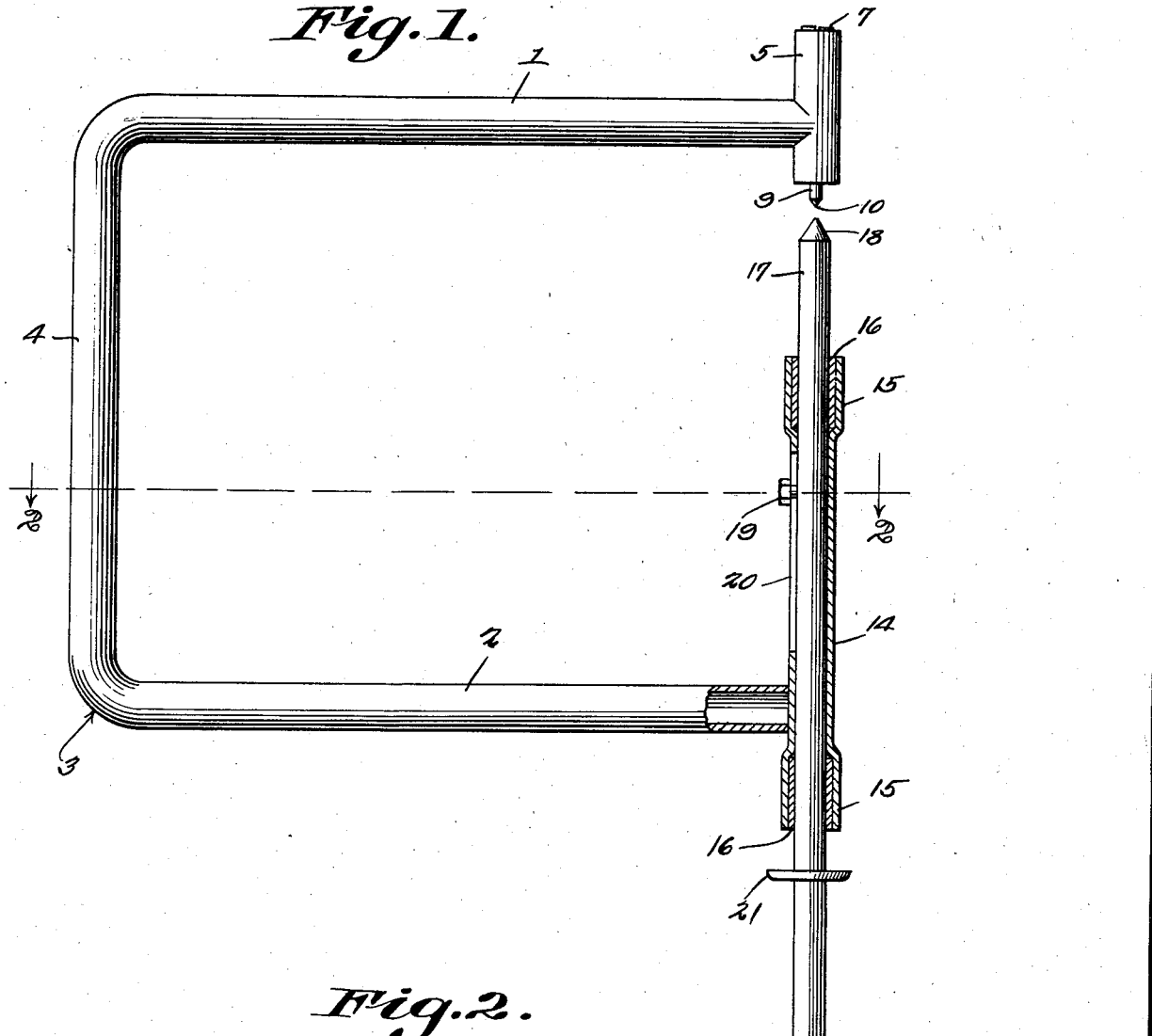

Patented Aug. 11, 1942

2,292,625

UNITED STATES PATENT OFFICE 2,292,625

AUTOMOBILE REPAIR TOOL

Cecil A. Fellers, Findlay, Ohio

Application December 13, 1940, Serial No. 370,070

2 Claims. (Cl. 81—15)

The device forming the subject matter of this application is adapted to be used for flattening out dents in many places on an automobile, especially dents in the fenders.

One object of the invention is to provide a simple indicating means whereby the operator may know exactly where the hammer is going to strike, relatively to the dent, even though the hammer cannot be seen. A further object of the invention is to supply novel means for mounting and controlling the indicator, a further object of the invention being to improve the construction of the dent-removing hammer and to improve the mounting thereof.

Stated in shorter words, by placing the indicator pin of the device directly over a low spot, an operator can then raise the low spot to its proper level, for refinishing the metal with a body file, sanding disk or the like, and do so without any guess work.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in elevation, a tool constructed in accordance with the invention, one of the guides being in section;

Fig. 2 is a section on the line 2—2 of Fig. 1;

Fig. 3 is a sectional view, showing in detail, the indicator and its mounting;

Fig. 4 is an elevation disclosing a modification in the hammer;

Fig. 5 is an elevation showing a modified form of the invention.

Referring to the form depicted in Figs. 1, 2 and 3, the tool is shown as comprising a substantially U-shaped frame 3, which, in the interest of lightness combined with strength, may be made of tubular stock. The frame 3 comprises a first arm 1 and a second arm 2, arranged in approximate parallelism, the arms being joined together, in an integral structure, by an intermediate portion 4.

The free end of the first arm 1 carries, rigidly, a first tubular guide 5, disposed approximately at right angles to that arm. An annular stop 6 is fixed in the first guide 5, as Fig. 3 shows. A guide plug 7 is threaded into the outer end of the first tubular guide 5, and is supplied at its inner end with a central bore 8.

An indicator pin 9 is mounted for straight line reciprocation in the stop 6 and in the bore 8 of the guide plug 7. The indicator pin 9 has a pointed inner end 10. An annular abutment 11 is secured to the indicator pin 9, within the guide 5. The abutment 11 is adapted to make contact with the stop 6, and when the parts are in engagement, the outer end of the indicator pin 9 still is in the bore 8 of the guide plug 7. A compression spring 12 surrounds a portion of the indicator pin 9, one end of the spring finding abutment against the inner end of the plug 7, and the opposite end of the spring engaging the abutment 11.

A second tubular guide 14 is secured to the free end of the second arm 2 and is disposed approximately at right angles thereto. The guide 14 is arranged in coaxial relation with respect to the guide 5. The guide 14 is supplied with enlarged end portions 15, receiving bushings 16.

A hammer rod 17 is guided for straight line movement in the bushings 16 and in the intermediate portion of the guide 14. At its inner end, a hammer rod 17 is provided with a bluntly pointed nose 18, located in axial alinement with the pointed end 10 of the indicator pin 9. In order to prevent the hammer rod 17 from rotating, it carries a lateral projection 19, such as a machine screw, received and guided in a longitudinal slot 20 in the guide 14.

The hammer rod 17 may be operated in various ways. It can be actuated by the hand of an operator, to impart a light, medium or heavy blow, raising the low spots to their proper level. If desired, a handle (not shown) may be mounted on the outer end of the hammer rod 17, the hammer rod being provided with a disk 21, serving as a stop or abutment for the handle.

In the event that the hammer rod 17 wears away the bushings 16 and the intermediate portion of the guide 14, to such an extent that the hammer rod does not travel in true coaxial relation with respect to the indicator pin 9, this difficulty can be remedied by removing worn bushings 16 and substituting new bushings.

The tool is straddled on the fender or other piece of material upon which the work is to be done. The pointed indicator pin 9, advanced by the spring 12, can be seen readily, and its pointed end 10 may be placed accurately with regard to the dent that is to be raised. The operator then knows that the hammer rod 17 will raise the dent, when the hammer rod is reciprocated. The indicator pin 9 retires, compressing the spring 12, and the hammer rod 17 does its work, raising the dent accordingly.

The pointed end 18 of the hammer rod 17 is useful for raising a small dent only, but the working end of the hammer rod may be of any desired shape. In Fig. 4, parts hereinbefore described have been designated by numerals already used, with the suffix a. In that view, the hammer rod 17a has a reduced extension 22, provided with a convexed end 23, affording considerably more area than is furnished by the pointed nose 18 of the hammer rod 17 in Fig. 1.

The distance between the frame arms 1 and 2 will depend upon the nature of the structure upon which the dent removing operation is to be performed. In Fig. 5, parts hereinbefore described have been designated by numerals already used, with the suffix b. The arms 1b and 2b are spaced less widely than are the corresponding arms in Fig. 1, diagonal braces 24 connecting the intermediate portion 4b of the frame 3b with the arms 1b and 2b, in the interest of increased strength in the frame 3b.

In any of its forms, the device forming the subject matter of this application will be found thoroughly effective for the purpose hereinbefore explained.

The constituent material of the tool may be selected as desired, and it will be understood that hardening, or hard metal, may be resorted to wherever necessary or desirable. The function of the projection 19 on the hammer 17, cooperating with the slot 20, is to prevent the hammer from becoming detached by dropping out of place, the hammer being disposed always in a position for use.

Having thus described the invention, what is claimed is:

1. In a dent-removing tool, a substantially U-shaped frame including first and second arms, a first tubular guide secured intermediate its ends to the free end of the first arm, a second tubular guide secured intermediate its ends to the free end of the second arm, bushings removably mounted in the ends of the second guide, a hammer mounted for reciprocation in the bushings, and a spring-pressed indicator movably mounted in the first guide, independently of the bushings, the inner ends of the indicator end of the hammer being disposed in axial alinement.

2. In a dent-removing tool, a substantially U-shaped frame including first and second arms, a first guide at the free end of the first arm, a second guide at the free end of the second arm, a hammer mounted for reciprocation in the second guide, a removable closure plug in the outer end of the first guide and having a bore in its inner end, an annular stop in the first guide, an indicator pin mounted for reciprocation in the bore and in the stop, the pin being provided with an abutment, a compression spring surrounding a portion of the pin, one end of the spring engaging the inner end of the plug, the opposite end of the spring engaging the abutment, the length of the pin from its outer end to the abutment being such that the abutment will engage the stop before the outer end of the pin is withdrawn from the bore, and the inner ends of the pin and of the hammer being disposed in axial alinement.

CECIL A. FELLERS.